United States Patent [19]

Horvath et al.

[11] Patent Number: 4,712,709
[45] Date of Patent: Dec. 15, 1987

[54] FUEL-INTAKE DEVICE FOR VEHICLE TANK

[76] Inventors: Ronald F. Horvath; Barbara L. Horvath, both of 4325 Kennedy Dr., #204, Racine, Wis. 53404

[21] Appl. No.: 856,172

[22] Filed: Apr. 28, 1986

[51] Int. Cl.[4] .................................... B67D 5/04
[52] U.S. Cl. ..................................... 220/334; 141/5; 141/113; 220/85 F; 220/86 R
[58] Field of Search ............... 141/1, 5, 7, 113, 286, 141/290, 301, 348, 349, 350; 220/1 V, 254, 259, 334, 336, 85 F, 85 P, 85 V, 85 VR, 85 VS, 86 R, DIG. 33; 251/149, 149.2

[56] References Cited

U.S. PATENT DOCUMENTS

| | | | |
|---|---|---|---|
| 1,575,097 | 3/1926 | Conner | 220/336 |
| 2,138,104 | 11/1938 | Kellogg | 220/86 R |
| 2,234,393 | 3/1941 | Amiot | 220/86 R |
| 2,588,869 | 3/1952 | Pinaire | 141/113 |
| 3,323,755 | 6/1967 | Voitas et al. | 220/336 R |
| 3,380,619 | 4/1968 | Boddie | 220/86 R |
| 3,432,997 | 3/1969 | Downey | 251/149.2 X |
| 3,617,034 | 11/1971 | Skinner | 220/85 VR X |
| 4,165,769 | 8/1979 | Hoffman | 141/349 X |
| 4,212,333 | 7/1980 | Randolph | 141/113 X |
| 4,573,694 | 3/1986 | Goto et al. | 220/86 R X |

*Primary Examiner*—Charles E. Phillips
*Assistant Examiner*—Mark J. Thronson
*Attorney, Agent, or Firm*—Peter N. Jansson

[57] ABSTRACT

A fuel-intake device for automatic bottom fueling. The device includes spaced inner and outer barrier walls with edge portions joined together, first and second aligned openings in the barrier walls, and a standpipe having a proximal end secured to the inner wall about the second opening and a distal end having a fuel outlet spaced from the inner wall. Two annular seals preferably allow a conical nozzle to sealingly engage both barrier walls. Other preferred embodiments relate to barrier wall, seal, and standpipe configurations, fuel and vapor pressure relief valves, entry doors and a protective cover.

20 Claims, 3 Drawing Figures

FUEL-INTAKE DEVICE FOR VEHICLE TANK

FIELD OF THE INVENTION

This invention relates generally to apparatus on fuel tanks for receiving fuel and, more particularly, to intake devices for automatic fueling. Still more particularly, this invention relates to intake devices for automatic fueling through a tank bottom.

BACKGROUND OF THE INVENTION

Retail selling of gasoline and other vehicle fuels is a major industry throughout the world. By one recent estimate, there are on the order of 200,000 retail fuel service stations in the United States alone.

Such stations are referred to as either "full service" stations or "self service" stations, depending on whether a station employee or the customer himself is responsible for manipulating the pump, fuel hose, and valve structure into position for fueling the vehicle. In either case, however, substantial human activity is required by a person outside the vehicle to accomplish the fueling of the vehicle fuel tank.

In view of the extremely high volume of retail fuel sales, the high costs of providing full service, and the inconvenience for a customer of all the manipulative steps necessary for vehicle fueling, a need exists for improved fueling station methods and apparatus. In particular, a need exists for practical automatic fueling apparatus and methods.

A number of attempts have been made in the prior art to improve retail fueling procedures. Some examples include the disclosures of the following United States Pat. Nos.:

3,095,020 (Darwin)
3,364,940 (Ginsburgh et al.)
3,410,320 (Ginsburgh et al.)
3,502,117 (Nebelsiek et al.)
3,527,268 (Ginsburgh)
3,530,906 (Ginsburgh et al.)
3,536,109 (Ginsburgh et al.)
3,642,036 (Ginsburgh et al.)

These patents describe various methods and types of apparatus for facilitating fueling, and for automatic fueling using overhead, on-ground or below-ground equipment. However, the automatic fueling systems and methods disclosed in the prior art have substantial inherent practical problems.

A need has existed for an improved practical approach to automatic engagement of a filling nozzle with fuel tank intake devices on vehicles. In particular, there is a need for an improved tank-mounted fuel-intake device which can readily be engaged automatically by a filling nozzle for filling through the bottom of a vehicle tank.

SUMMARY OF THE INVENTION

This invention is a fuel-intake device which is mountable on the bottom of a vehicle fuel tank. In a primary application, this invention forms part of a system for automatically filling liquid fuels into automobiles and other vehicles at vehicle fueling stations without the need for manual intervention.

The automatic filling system involves a specialized below-ground apparatus for fueling vehicles above it through the fuel-intake device of this invention. The automatic filling system and a preferred nozzle apparatus for engaging the fuel-intake device of this invention are the subjects of our copending patent applications, Ser. Nos. 825,574 and 825,575, entitled IMPROVED AUTOMATIC FUELING APPARATUS AND METHOD and NOZZLE APPARATUS AND ENGAGEMENT METHOD, respectively.

A brief description of the automatic filling system and preferred nozzle apparatus will be helpful to an understanding of the fuel-intake device of this invention. The nozzle apparatus, which includes a frame assembly and an upwardly-facing conical nozzle member, protrudes upwardly from beneath the surface of the ground, under the control of special guidance and control means, to penetrate and engage the fuel-intake device of this invention. The intake device is generally flush with the bottom of the vehicle fuel tank, and itself forms part of the tank bottom wall.

After a vehicle has been driven into position over the below-ground apparatus, and various preliminary and final positioning steps (which need not be described here) have been taken, the frame assembly and nozzle are raised automatically until the nozzle penetrates and engages the fuel-intake device. While the nozzle and intake device are engaged, fuel is pumped therethrough into the vehicle fuel tank.

The fuel-intake device of this invention includes a pair of spaced horizontal walls, often referred to herein as inner and outer barrier walls, having edge portions which are joined together to form an inner (or upper) volume which is isolated from the fuel inside the tank. The outer (or lower) and inner barrier walls have major openings through them, sometimes referred to herein as first and second openings, respectively. The first (or lower) and second (or upper) openings are preferably aligned, that is, centered along a common axis, and serve to receive and engage the nozzle.

The device also includes a standpipe inside the tank. The standpipe has a proximal end secured to the inner barrier wall about the second opening and a distal end spaced from the inner barrier wall—preferably at or close to the top of the fuel tank. The standpipe carries fuel from the nozzle into the tank. Fuel flowing through the standpipe during filling exits the standpipe into the tank through a fuel outlet at the distal end. The standpipe serves to prevent outflow of fuel from the fuel tank, since the fuel outlet at the end of the standpipe is located above the level of the liquid fuel in the tank.

In a highly preferred embodiment, outer and inner annular seals are on the first and second openings, respectively, so that the filling nozzle may sealingly engage both the outer and inner barrier walls during fueling. These two annular seals preferably form offset concentric circles, with the inner seal having a smaller diameter than the outer seal. The differing diameters are chosen to accommodate the conical filling nozzle.

The two barrier walls are preferably parallel. In a highly preferred embodiment, the inner barrier wall has a flat portion which is parallel to the outer barrier wall and a frusto-conical portion forming the opening in the inner barrier wall. The frusto-conical portion, which is secured at its wide end to the flat portion of the inner barrier wall, has an inside surface which supports the annular inner seal. This configuration accommodates engagement with a nozzle particularly well.

In a highly preferred embodiment, a one-way fuel flow valve is located above the second opening, preferably in the standpipe and most preferably at the proximal end of the standpipe. Such one-way fuel valve allows fuel inflow from the nozzle, but prevents fuel backflow. Such valve eliminates problems of fuel leakage during use of the vehicle.

A vapor passageway preferably extends from near the distal end of the standpipe to a small opening in the outer barrier wall adjacent to the aforementioned first opening, in which the nozzle is received. The vapor passageway preferably extends along the standpipe.

A pressure relief valve is preferably included in the vapor passageway. Such pressure relief valve opens the vapor passageway to allow vapor outflow when vapor pressure in the tank headspace rises during fueling, but closes the vapor passageway to prevent vapor and fuel outflow at other times. Such pressure relief valve is preferably located at the outer barrier wall.

The standpipe preferably includes an upward portion which extends from the standpipe proximal end and a lateral portion extending laterally from the upward portion to the distal end of the standpipe. The lateral portion has an upper surface which is adjacent to the fuel tank top. Part of the vapor passageway preferably extends along the upper surface of such lateral portion, and one or more vapor inlets along such upper surface join the tank headspace to the vapor passageway. The vapor passageway then extends downwardly along the upward portion of the standpipe and through the inner barrier wall to the outer barrier wall, where vapor exits the vehicle fuel tank.

The location of the vapor outlet close to the large first opening in the outer barrier wall allows a vacuum device which is part of the filling apparatus to remove vapor from the tank during the filling operation. In this way, such vapor may be captured by filters or otherwise to reduce environmental problems associated with the release of vapor to the atmosphere.

In preferred embodiments, the lateral portion of the standpipe has a length (or "cross-length") which is less than the cross-dimension of the barrier walls at their edge portions. This configuration allows the device to be easily inserted into an opening in the bottom of a fuel tank during assembly with the fuel tank.

The edge portions of the inner and outer barrier walls, which are joined together, preferably include means for mounting the fuel-intake device to the bottom wall of a vehicle fuel tank such that the intake device replaces a portion of the bottom wall of the tank. Such mounting may be by welding around the edge portions or by the use of bolts or other fastening devices.

In assembly, the distal end of the standpipe may first be inserted into a prepared opening in a vehicle fuel tank, and then the edge portions of the barrier walls may be brought into engagement with the edges of such tank opening for mounting. The configuration of the intake device allows existing fuel tanks to be retrofit easily with the intake device of this invention. A somewhat different assembly method may be used when the intake device is included in and on a fuel tank as original equipment.

In certain preferred embodiments, the outer barrier wall has a depressible entry door which is secured thereto. Such depressible entry door preferably includes a plurality of sector doors which are hingedly attached along the inside surface of the outer barrier wall and spring-biased to a closed position. When the filling nozzle pushes against such sector doors, they readily open such that the nozzle is received into the first opening. Insertion of the nozzle stops when the conical wall of the nozzle engages the outer seal around such first opening and the inner seal around the second opening. When the nozzle is withdrawn, the sector doors will return to their closed position.

Preferred embodiments of the intake device of this invention include a removable cover. Such removable cover is preferably mounted to the edge portion of the outer barrier wall in a manner allowing it to swing in a plane parallel to that of the outer barrier wall. Such cover is spring-biased to its rest position, covering the outer barrier wall. The cover may be swung to the side by the action of a cable and held in such removed position, away from the barrier wall, during filling. After the withdrawal of the filling nozzle, the cover springs back to its closed position over the outer barrier wall.

The fuel-intake device of this invention may be manufactured at modest cost. As noted, it may be factory-installed by automobile makers as part of original equipment, or installed as a retrofit device in vehicle fuel tanks for drivers wishing to have the convenience of automatic fueling for their old cars.

OBJECTS OF THE INVENTION

It is an object of this invention to provide a fuel-intake device useful in a system for automatic vehicle fueling.

Another object of this invention is to provide an improved fuel-intake device for automatic bottom fueling of vehicle tanks.

Another object of this invention is to provide an intake device for automatic bottom fueling which may be easily be retrofit on existing vehicles to adapt them for automatic fueling.

These and other objects will be apparent from the following additional descriptions and from the drawings, wherein:

DETAILED DESCRIPTIONS OF PREFERRED EMBODIMENTS

Figure 1:
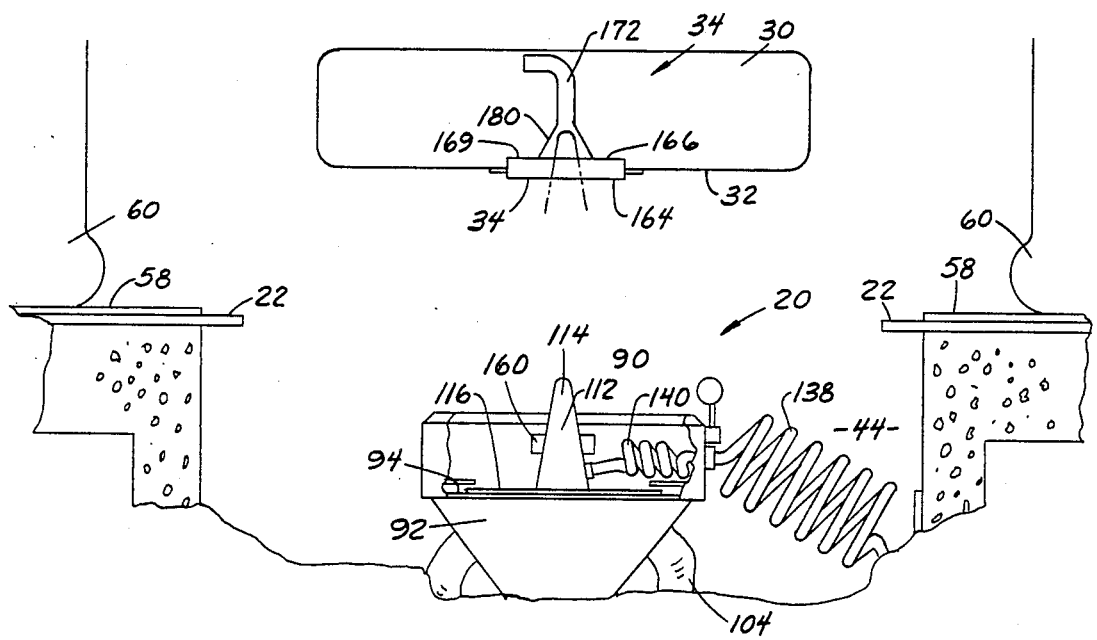
FIG. 1 is a side elevation, partially broken away and partially in section (without background), showing a fuel-intake device in accordance with this invention positioned above the below-ground filling apparatus which will engage it for filling.
Figure 2:
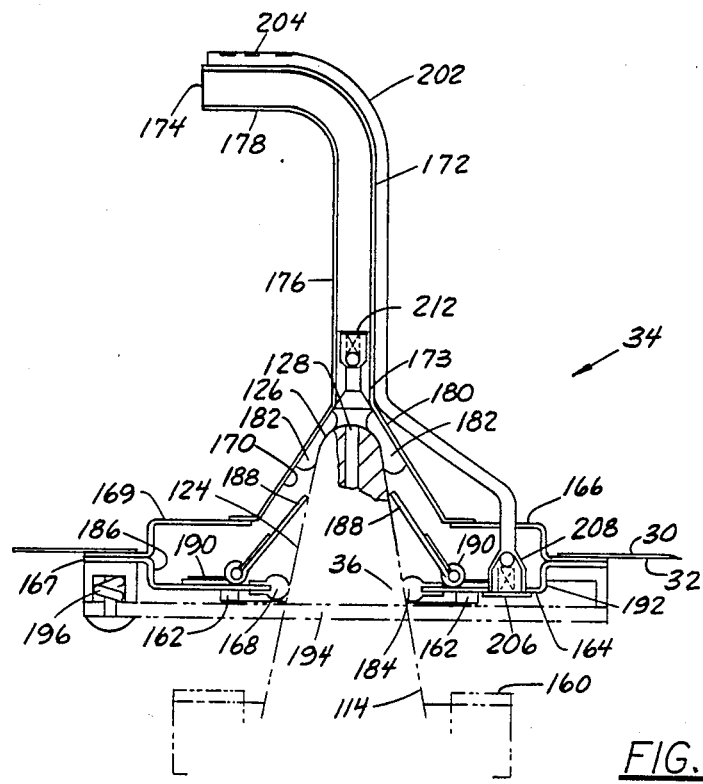
FIG. 2 is an enlarged fragmentary side sectional view of the intake device on the bottom of a vehicle fuel tank, with its removable cover member and a portion of the nozzle apparatus of this invention illustrated in phantom lines.
Figure 3:
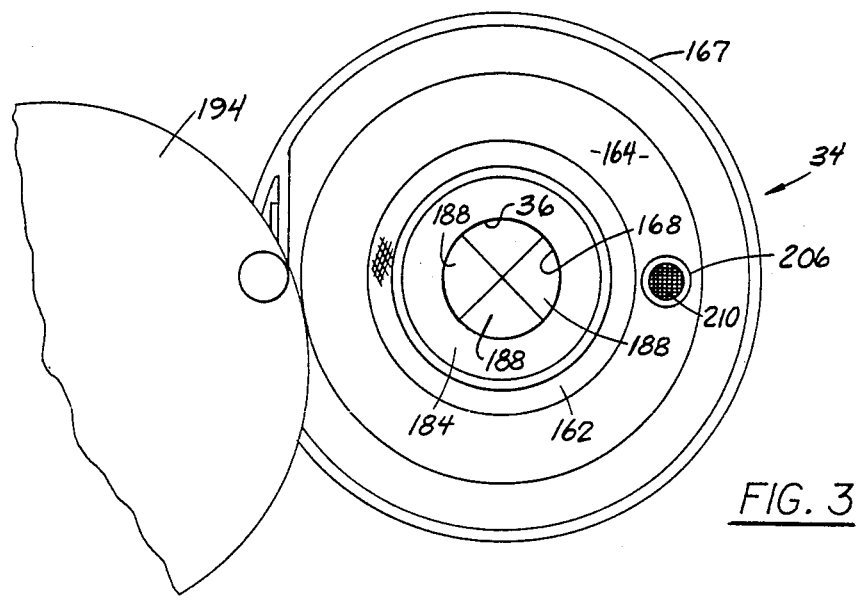
FIG. 3 is a bottom view of FIG. 2, with the cover of the receiving unit open.

The figures illustrate a preferred intake device 34 which will be engaged by a nozzle member 112 of a below-ground fueling apparatus 20. FIG. 1 illustrates the general layout of below-ground fueling apparatus 20 and its positioning with respect to the fuel tank of an automobile parked above it for fueling.

Before describing intake device 34 in detail, a brief description of fueling apparatus 20 will be given.

Below-ground fueling apparatus 20 is mounted in a pit 44, beneath a pair of sliding doors 22. Sliding doors 22 just beneath vehicle support surfaces 58, at the ground level, slide to the open position shown in FIG. 1. This allows nozzle-carrying frame 90 to come up into engagement with fuel-intake device 34.

A vehicle, the wheels 60 of which rest on vehicle support surface 58 during the automatic fueling process, has a vehicle fuel tank 30 with an exposed, generally flat, vehicle tank bottom 32 and an opposed top wall. Fuel inlet member 34 thereon includes an inlet 36 which receives fuel from fueling apparatus 20.

Fueling apparatus 20 includes a nozzle-carrying frame 90 which has a frusto-conical air funnel 92, a flat horizontal apertured bed member 94, and a nozzle member 112. Nozzle member 112 is the portion of below-ground fueling apparatus 20 which is engageable with tank inlet 36 during fueling.

Blowers (not shown) are in pneumatic communication, by means of air hoses, such as air hose 104, with an air plenum formed within air funnel 92. During fueling, one such blower creates a partial vaccuum in the air plenum and, by virtue of the apertures in bed member 94, serves to remove fuel vapors which may be found near nozzle 112.

Nozzle member 112 includes a cone 114, which forms a vertically-oriented outlet member, and a base element 116. Base element 116 has a horizontal lower surface which rests on horizontal bed member 94. Cone 114 has a tapered wall 124 which extends upwardly from base element 116 to a narrow distal end 126. The tapering of cone 114 allows its distal end 126 to be easily inserted into tank inlet 36 in a manner hereafter described. The conical configuration of nozzle member 112 also allows it to seal in fluid-tight fashion with fuel-intake device 34.

A fuel outlet 128 is formed in distal end 126 of nozzle member 112. Liquid fuel reaches nozzle member 112 by means of conduits including flexible lines 138 and 140. The flow of fuel through nozzle member 112 and intake device 34 is controlled by means which are not shown and not relevant to this invention.

Mounted on opposite sides of tapered wall 124 of nozzle cone 114 are a pair of photocell lights 160 which are aimed in an upward direction. Photocell lights 160 cooperate, in a manner not relevant to this invention, with a reflector ring 162 located on the bottom of fuel-intake device 34, to aid in proper the alignment of nozzle 112 and fuel-intake device 34 prior to their engagement.

Fuel-intake device 34 is substantially flush with the bottom 32 of fuel tank 30. Intake device 34 has spaced outer and inner horizontal barrier walls 164 and 166 to which various elements are secured. Outer and inner barrier walls 164 and 166 are joined together at edge portions 167, and intake device 34 is welded to tank 30 along edge portions 167.

Outer barrier wall 164 defines a circular opening 168 which is sized to readily receive distal end 126 of nozzle cone 114. Inner barrier wall 166 includes two portions—a flat portion 169 which is parallel to outer barrier wall 164 and a frusto-conical portion 180 extending upwardly from a circular opening 170 which is formed in horizontal portion 169. Opening 170 is sufficient in size to receive distal end 126 of cone 114, and frusto-conical portion 180 of inner barrier wall 166 itself forms a smaller opening where cone 114 engages it.

A standpipe 172 is integrally formed with, or otherwise attached to, frusto-conical portion 180 of inner barrier wall 166. Standpipe 172 extends upwardly from its proximal end 173, which is secured to the smaller upper end of frusto-conical portion 180, to a distal or outlet end 174. Gasoline or other liquid fuel pumped through standpipe 172 passes through distal end 174 into fuel tank 30, and standpipe 172 serves to contain fuel within fuel tank 30 by isolating the fuel from inlet 36 of intake device 34.

Standpipe 172 includes an upward portion 176 and a lateral portion 178. Upward portion 176 extends from the standpipe proximal end upwardly to lateral portion 178 and lateral portion 178 extends laterally from upward portion 176 to distal end 174. Lateral portion 178 has an upper surface closely adjacent to the fuel tank top. The length of lateral portion 178 is less than the width of outer and inner barrier walls 164 and 166 at edge portions 167 thereof. This facilitates retrofitting of fuel-intake device 34 into existing fuel tanks, as previously described.

Frusto-conical portion 180 of inner barrier wall 166 has an inside surface with an annular inner seal 182 on it. Inner seal 182 is formed of an elastic seal material bonded to frusto-conical portion 180. Inner seal 182 is positioned for fluid-tight engagement with distal end 126 of cone 114 to stop leakage during fueling. The opening sometimes referred to herein as the "second" opening, or as the opening in the inner barrier wall, is considered to be located at the position of inner seal 182.

An elastic annular outer seal 184 is engaged about circular opening 168. Outer seal 184 is located and sized to provide an additional seal against nozzle cone 114 during fueling. Tapered wall 124 of cone 114 bears against annular outer seal 184 during fueling to form a substantially fluid-tight seal.

On the inside surface 186 of outer horizontal wall 164 are four sector doors 188 which together cover inlet 36. Sector doors 188 are hinge-mounted and are biased by springs 190 to a horizontal closed position. Sector doors 188 are opened by the insertion of distal end 126 into opening 168 and, during the pumping of fuel through conical nozzle 114 and standpipe 172, sector doors 188 press against tapered wall 124 of cone 114. Upon withdrawal of cone 114 from opening 168, sector doors 188 close automatically by the action of springs 190.

Reflector ring 162, previously mentioned, is secured on the outside surface 192 of outer horizontal wall 164. As noted, reflector ring 162 serves to help align conical nozzle 114 with inlet 36.

A one-way fuel line ball check valve 212 is located in standpipe 172 at its proximal end, just above the second opening. Ball check valve 212 readily opens to allow fuel inflow from nozzle 112, but closes when the fuel flow is stopped. Thus, ball check valve 212 helps prevent fuel backflow and fuel leakage during vehicle use.

A one-way fuel line valve can be located at other positions within standpipe 172. For example, such a valve could be attached at distal end 174. However, the location of such valve at the standpipe proximal end tends to minimize backflow.

A vapor line 202 runs along the full length of standpipe 172, beginning at distal end 174, and extends beyond the proximal end of standpipe 172 through inner and outer barrier walls 166 and 164 to terminate in a small vapor outlet 206 through a screen 210 which is flush with outer barrier wall 164.

Vapor line 202 extends along the upper surface of lateral portion 178 of standpipe 172. Several small vapor inlets 204 are along such upper surface, thus admitting vapor to vapor line 202 close to the top of fuel tank 30. During fueling, the increasing amount of liquid fuel in tank 30 compresses the vapor in the tank headspace, raising headspace pressures. Vapor then flows through vapor inlets 204 into vapor line 202, and out through screen 210.

A vapor pressure relief valve 208 is in vapor line 202 just above screen 210. Pressure relief valve 208, which is a ball check valve, opens vapor line 202 to allow vapor outflow when vapor pressure in the tank headspace rises, but closes vapor line 202 to prevent vapor and fuel outflow at other times.

Vapor outlet 206 is closely adjacent to opening 36, in which nozzle cone 114 is received. This allows the vented vapor to be withdrawn by means of the aforementioned vacuum device. More specifically, vapor exiting through screen 110 is in the space above nozzle-carrying frame 90, and, by means of the vacuum blower not shown is drawn through apertured horizontal bed member 94, through the air plenum within funnel member 92, through hose 104, and from there into a filter means not shown. In this way, vapor release to the atmosphere is avoided.

Covering essentially the entire inlet member 34, along its lower surface, is a protective door 194. Protective door 194 is biased by a coil spring 196 to a closed position but may be moved by a cable (not shown), operable by the driver from the driver's seat, to uncover inlet member 34. Protective door 194 serves to shield sector doors 188, screen 110 and reflector ring 162 from road dirt and the like.

Fuel-intake device 34 may be made using available materials. Acceptable materials would be apparent to those skilled in the art who are familiar with this disclosure.

The barrier walls, standpipe, sector doors, and cover are preferably of steel construction. Sector doors 188 may be coated with a sealing layer so that together they form a reasonable fluid-tight seal when the nozzle member is withdrawn. Seal material 182 and edge seal 184 may be made of neoprene, a fiber-reinforced elastomer, or any sealing material which is immune to attack by the fluid fuel. The valves are of materials such as nylon which are not attacked by the gasoline or other fluid fuel.

While the principles of this invention have been described in connection with specific embodiments, it should be understood clearly that these descriptions are made only by way of example and are not intended to limit the scope of the invention.

What is claimed:

1. In a vehicle fuel tank of the type having a substantially flat bottom wall, an opposed top wall, and fuel intake means, the improvement in the fuel intake means comprising:
   spaced upper and lower barrier walls having edge portions joined together and to the flat bottom wall;
   lower and upper openings in the lower and upper barrier walls, respectively; and
   a standpipe having a proximal end beginning at and secured to the upper barrier wall about the upper opening and extending upwardly to a distal end adjacent to the top wall of the tank, the distal end having fuel outlet means therein.

2. The vehicle fuel tank of claim 1 wherein the lower and upper openings are aligned.

3. The vehicle fuel tank of claim 2 further comprising outer and inner annular seals on the lower and upper openings, respectively, whereby a nozzle may sealingly engage both the lower and upper barrier walls during fueling.

4. The vehicle fuel tank of claim 3 wherein the inner and outer annular seals form offset concentric circles, the inner seal having a smaller diameter than the outer seal whereby a conical nozzle may be sealingly engaged during fueling.

5. The vehicle fuel tank of claim 2 wherein the upper barrier wall includes a frusto-conical portion forming the upper opening, the frusto-conical portion having an inside surface supporting an annular inner seal means, whereby a nozzle may sealingly engage the upper barrier wall during fueling.

6. The vehicle fuel tank of claim 5 further including an outer annular seal means on the lower opening, whereby a nozzle may sealingly engage both the lower and upper barrier walls during fueling.

7. The vehicle fuel tank of claim 6 wherein the inner and outer annular seal means form offset concentric circles, the inner seal means having a smaller diameter than the outer seal means whereby a conical nozzle may be sealingly engaged during fueling.

8. The vehicle fuel tank of claim 2 wherein the upper and lower barrier walls are substantially parallel.

9. The vehicle fuel tank of claim 1 further including means at the edge portions for mounting to the tank bottom wall.

10. The vehicle fuel tank of claim 1 further including a one-way fuel flow valve above the upper opening, allowing fuel inflow but preventing fuel back flow.

11. The vehicle fuel tank of claim 10 wherein the fuel flow valve is in the standpipe.

12. The vehicle fuel tank of claim 11 wherein the fuel flow valve is at the proximal end of the standpipe.

13. The vehicle fuel tank of claim 1 further including a vapor opening in the lower barrier wall adjacent to the lower opening and a vapor passageway extending from near the distal end to the vapor opening.

14. The vehicle fuel tank of claim 13 wherein the vapor passageway extends along the standpipe.

15. The vehicle fuel tank of claim 13 further including a pressure relief valve in the vapor passageway, such pressure relief valve opening the vapor passageway to allow vapor outflow when vapor pressure in the tank headspace rises during fueling but closing the vapor passageway to prevent vapor and fuel outflow at other times.

16. The vehicle fuel tank of claim 15 wherein the standpipe includes an upward portion extending from the proximal end and a lateral portion extending from the upward portion to the distal end, the lateral portion having an upper surface adjacent to the top wall of the tank, the vapor passageway extending along the upper surface and including vapor inlet means.

17. The vehicle fuel tank of claim 1 wherein the standpipe includes an upward portion extending from the proximal end and a lateral portion extending from the upward portion to the distal end, the lateral portion having a cross-length less than the cross-dimensions of the barrier wall edge portions, whereby the device may easily be inserted into an opening in the bottom wall during assembly.

18. The vehicle fuel tank of claim 1 wherein the lower barrier wall has an inside surface, and further including a depressible entry door covering the lower opening, said door comprising a plurality of sector doors hingedly attached along the inside surface of the lower barrier wall and spring-biased to a closed position.

19. The vehicle fuel tank of claim 1 further including a removable intake device cover over the lower opening.

20. The vehicle fuel tank of claim 19 wherein:
   the outer barrier wall is substantiall planar; and
   the cover is mounted to the joined edge portions to pivot in a plane parallel to the plane of the lower barrier wall and is spring-biased to a covering position over the lower barrier wall.

* * * * *